United States Patent
Gokita

(10) Patent No.: US 11,275,531 B2
(45) Date of Patent: Mar. 15, 2022

(54) STORAGE SYSTEM, MANAGEMENT APPARATUS AND STORAGE MEDIUM

(71) Applicant: FUJITSU LIMITED, Kawasaki (JP)

(72) Inventor: Shun Gokita, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/100,998

(22) Filed: Nov. 23, 2020

(65) Prior Publication Data
US 2021/0232346 A1   Jul. 29, 2021

(30) Foreign Application Priority Data
Jan. 27, 2020   (JP) .............................. JP2020-011078

(51) Int. Cl.
*G06F 3/06*    (2006.01)
(52) U.S. Cl.
CPC .......... *G06F 3/0682* (2013.01); *G06F 3/0604* (2013.01); *G06F 3/0652* (2013.01)
(58) Field of Classification Search
CPC ...... G05B 13/00–048; G05B 15/00–02; G05B 17/00–02; G06F 1/00–3296; G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 17/00–40;
(Continued)

(56) References Cited

U.S. PATENT DOCUMENTS 6,249,849 B1 *  6/2001  Day, III .................. G06F 16/23
                                                      711/161
6,336,172 B1 *  1/2002  Day, III ................ G06F 3/0614
                                                      707/999.201
(Continued)

FOREIGN PATENT DOCUMENTS

JP    2001-147785 A    5/2001
JP    2003-521085 A    7/2003
(Continued)

OTHER PUBLICATIONS

In the Case of Tape, RAID Stands for "Redundant Array of Independent Devices"; Mo Nourmohamadian; Jan. 29, 2019; retrieved from https://web.archive.org/web/20190129044405/http://www.ultera.com/articles/case.htm on Sep. 24, 2021 (Year: 2019).*

(Continued)

*Primary Examiner* — Daniel C. Chappell
(74) *Attorney, Agent, or Firm* — Fujitsu Patent Center

(57) ABSTRACT

A management apparatus, includes a memory; and a processor coupled to the memory and configured to: manage a library device including one or more drive devices, an accommodation shelf in which accommodation cells that accommodate a plurality of tape media are arranged, and a robot that performs conveyance operation to convey the tape media between the accommodation cells and the drive devices, receive an instruction to write a plurality of pieces of writing data, set, as an erasure coding set, two or more pieces of writing data having a data size less than a threshold among the plurality of pieces of writing data, and allocate the two or more pieces of writing data to one of the plurality of tape media.

9 Claims, 14 Drawing Sheets

(58) Field of Classification Search
CPC ....... G06F 21/00–88; G06F 2009/3883; G06F 2009/45562–45595; G06F 2015/761–768; G06F 2201/00–885; G06F 2206/00–20; G06F 2209/00–549; G06F 2211/00–902; G06F 2212/00–7211; G06F 2216/00–17; G06F 2221/00–2153; G11B 20/00–24; G11B 33/00–1493
See application file for complete search history.

(56) References Cited

U.S. PATENT DOCUMENTS

| | | | |
|---|---|---|---|
| 6,336,173 B1* | 1/2002 | Day, III | G06F 3/0614 |
| | | | 711/161 |
| 6,473,829 B1* | 10/2002 | Dahman | G06F 3/0607 |
| | | | 707/999.201 |
| 6,516,425 B1 | 2/2003 | Belhadj et al. | |
| 6,581,185 B1 | 6/2003 | Hughes | |
| 10,382,554 B1* | 8/2019 | Danilov | H03M 13/293 |
| 2005/0120058 A1 | 6/2005 | Nishio | |
| 2006/0190205 A1* | 8/2006 | Klein | G06F 11/3457 |
| | | | 702/115 |
| 2008/0276125 A1* | 11/2008 | Akelbein | G06F 11/1448 |
| | | | 714/15 |
| 2017/0371543 A1* | 12/2017 | Wideman | G06F 3/0607 |
| 2018/0121129 A1* | 5/2018 | Sawhney | G06F 3/0604 |
| 2018/0302473 A1* | 10/2018 | Goker | G06F 16/1827 |
| 2019/0361606 A1* | 11/2019 | Goker | H03M 13/2918 |
| 2019/0370170 A1* | 12/2019 | Oltean | G06F 3/0688 |
| 2021/0132851 A1* | 5/2021 | Danilov | H03M 13/3761 |

FOREIGN PATENT DOCUMENTS

| | | |
|---|---|---|
| JP | 2005-165486 A | 6/2005 |
| WO | 01/54127 A1 | 7/2001 |

OTHER PUBLICATIONS

W. Haddock, P. V. Bangalore, M. L. Curry and A. Skjellum, "High Performance Erasure Coding for Very Large Stripe Sizes," 2019 Spring Simulation Conference (SpringSim), 2019, pp. 1-12, doi: 10.23919/SpringSim.2019.8732912. (Year: 2019).*

A. Al-Shahrani and A. Al-Jabri, "Array codes with error detection for efficient multitrack magnetic recording channels," Digest of the Asia-Pacific Magnetic Recording Conference, 2002, pp. WE-WE, doi: 10.1109/APMRC.2002.1037688. (Year: 2002).*

Yang Han, W. E. Ryan and R. Wesel, "Dual-mode decoding of product codes with application to tape storage," GLOBECOM '05. IEEE Global Telecommunications Conference, 2005., 2005, pp. 6 pp.-, doi: 10.1109/GLOCOM.2005.1577853. (Year: 2005).*

* cited by examiner

STORAGE SYSTEM, MANAGEMENT APPARATUS AND STORAGE MEDIUM

CROSS-REFERENCE TO RELATED APPLICATION

This application is based upon and claims the benefit of priority of the prior Japanese Patent Application No. 2020-11078, filed on Jan. 27, 2020, the entire contents of which are incorporated herein by reference.

FIELD

The embodiment discussed herein is related to a storage system, a management apparatus, and a storage medium.

BACKGROUND

The amount of data handled by information processing systems has been increasing and the amount of data stored has also been increasing rapidly. For archiving and backing up data in such information processing systems, a tape archive system using a plurality of cartridge tapes as recording media has been used.

As a data redundancy method in the tape archive system, replication has been performed in which the cartridge tapes are replicated.

In addition, by using erasure coding (loss correction coding), the number of tapes to be used may be reduced as compared with the replication. Hereinafter, the erasure coding may be referred to as EC.

A tape array system in which data is distributed to a plurality of cartridge tapes, added with redundant data (parity) for error correction and stored, so that user data may be reproduced when a cartridge tape fails may be referred to as redundant arrays of inexpensive tapes (RAIT).

For example, in a case where four cartridge tapes are made redundant, eight cartridge tapes are used to implement replication. In contrast, for example, in RAIT using two cartridge tapes as parity, redundancy may be implemented with six (=4+2) cartridge tapes.

Such RAIT is used, for example, in a high performance storage system (HPSS).

FIG. 13 is a diagram for describing a method of using a plurality of cartridge tapes by conventional RAIT.

In FIG. 13, RAIT 6 is illustrated in which two cartridge tapes among six cartridge tapes T1 to T6 are used to record parity P and parity Q. The two cartridge tapes used to record the parity P and the parity Q are sequentially switched in rotation.

In the RAIT 6 illustrated in FIG. 13, striping is implemented in which an object (Bitfiles 1 to 6) is divided into a plurality of data blocks each having a fixed length and written in a distributed manner to the six cartridge tapes T1 to T6.

Note that, in FIG. 13, a direction in which the plurality of cartridge tapes T1 to T6 is arranged (left-right direction in FIG. 13) may be referred to as a horizontal direction, and a direction along each of the cartridge tapes T1 to T6 (up-down direction in FIG. 13) may be referred to as a vertical direction. In the conventional tape archive system illustrated in FIG. 13, the data blocks constituting the object are arranged in a distributed manner in the horizontal direction.

In a case where an abnormality is detected in a data block of one of the cartridge tapes, the data block is restored using a remaining normal data block, and the parity P and the parity Q arranged in the horizontal direction.

For example, Japanese Laid-open Patent Publication No. 2001-147785, Japanese National Publication of International Patent Application No. 2003-521085, and Japanese Laid-open Patent Publication No. 2005-165486 are disclosed as related art.

SUMMARY

According to an aspect of the embodiments, a management apparatus, includes a memory; and a processor coupled to the memory and configured to: manage a library device including one or more drive devices, an accommodation shelf in which accommodation cells that accommodate a plurality of tape media are arranged, and a robot that performs conveyance operation to convey the tape media between the accommodation cells and the drive devices, receive an instruction to write a plurality of pieces of writing data, set, as an erasure coding set, two or more pieces of writing data having a data size less than a threshold among the plurality of pieces of writing data, and allocate the two or more pieces of writing data to one of the plurality of tape media . . .

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

However, in such a conventional tape archive system, a plurality of cartridge tapes needs to be read in order to read an object. In order to efficiently execute reading and writing from and to a plurality of cartridge tapes, a plurality of drives needs to be prepared and parallelized, which is costly.

In addition, in accessing a small object, a ratio of busy time other than access time for actual reading and writing from and to cartridge tapes is high, which is inefficient. Note that the busy time may be expressed by, for example, (robot standby time+mount time+seek time)×the number of drives.

In addition, it is also contemplated that an object is written to one cartridge tape. That is, for example, a method for arranging data blocks constituting an object in a vertical direction may be applied.

Figure 14:
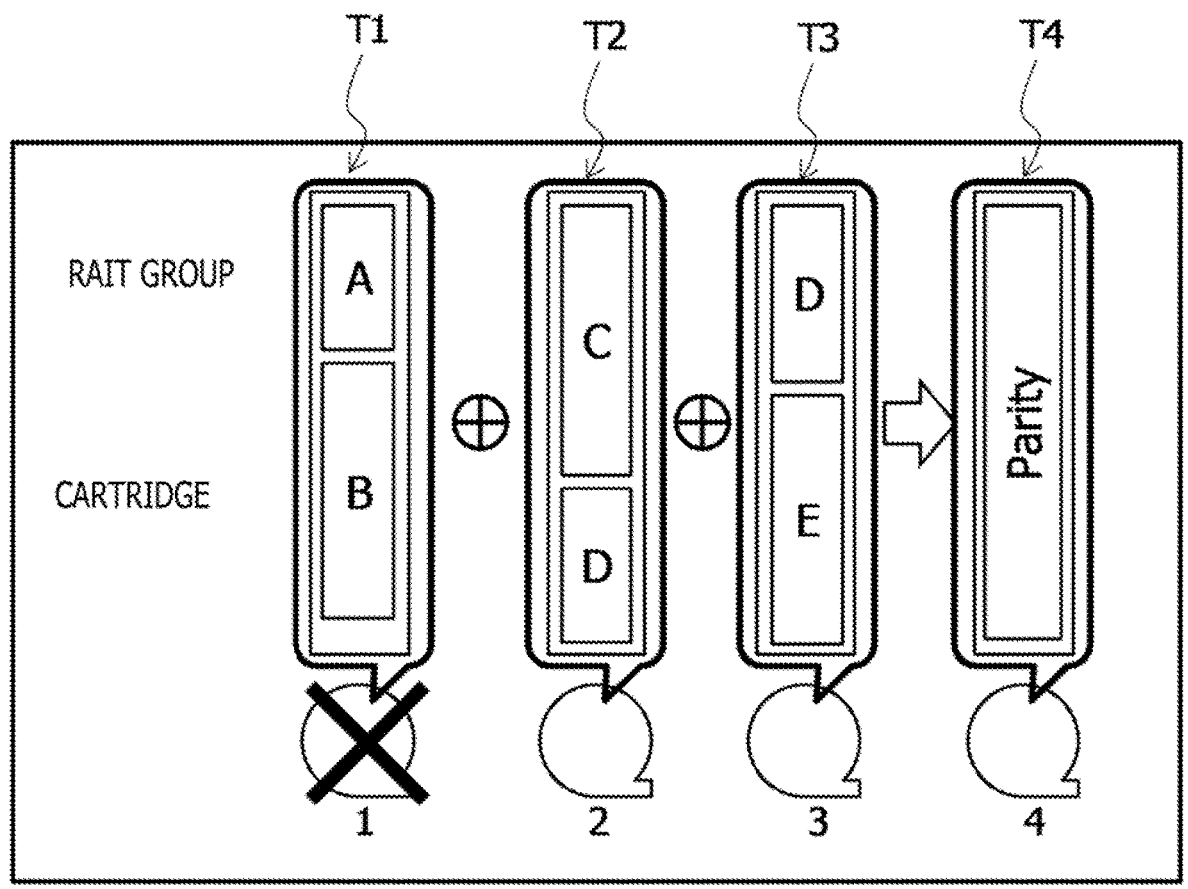
FIG. 14 is a diagram for describing a method of using a plurality of cartridge tapes by conventional RAIT.

FIG. 14 is a diagram for describing a method of using a plurality of cartridge tapes by conventional RAIT, and illustrates an example in which data blocks are arranged in a vertical direction.

In FIG. 14, a cartridge tape T4 among four cartridge tapes T1 to T4 is used to record parity.

However, in such a method of simply arranging data blocks in the vertical direction, reading is performed from a single cartridge tape. Thus, there is a problem that it is difficult to perform parallelization using a plurality of drives, and it takes time to access an object in a case where the size of the object is large.

In view of the above, it is desirable to enable data be efficiently written to a tape medium.

Hereinafter, an embodiment of a storage system, a management apparatus, and a data management program will be described with reference to the drawings. Note that the embodiment to be described below is merely an example, and there is no intention to exclude application of various modifications and techniques not explicitly illustrated in the embodiment. In other words, the present embodiment may be modified in various ways to be implemented without departing from the spirit of the embodiment. In addition, each drawing is not intended to include only components illustrated in the drawing and may include other functions and the like.

(A) Configuration

Figure 1:
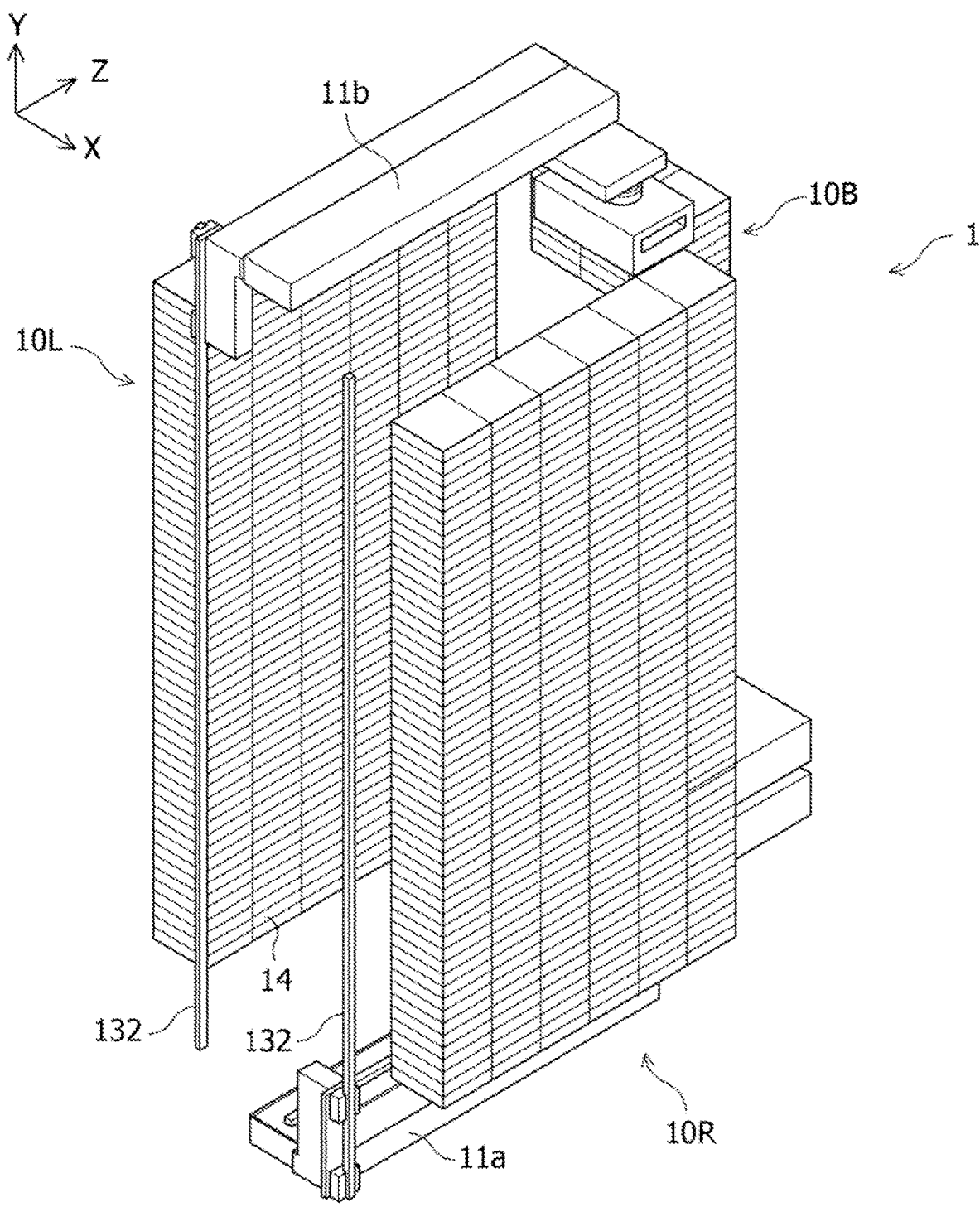
FIG. 1 is a perspective view illustrating a configuration of a tape archive system as an example of an embodiment.
Figure 2:
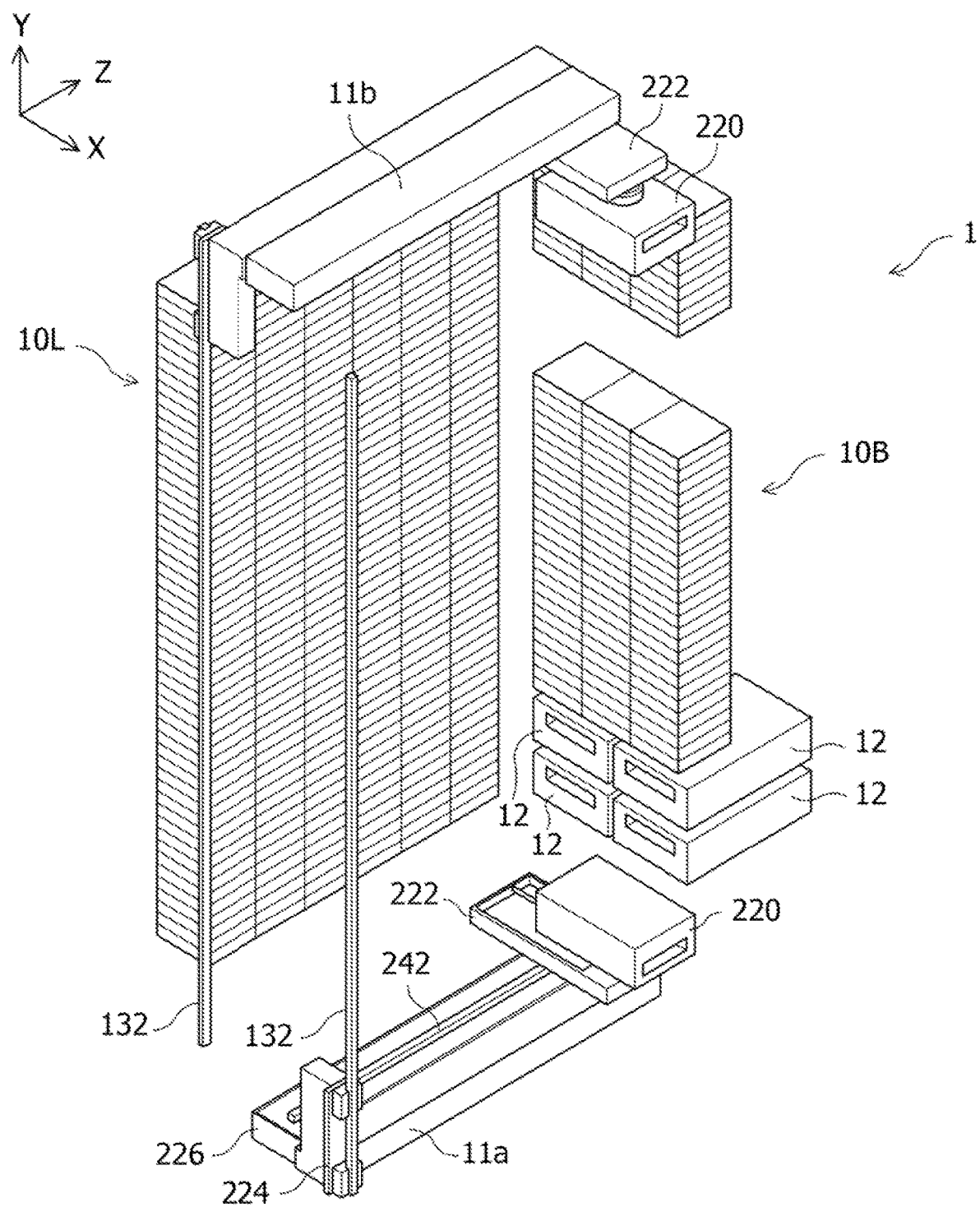
FIG. 2 is a perspective view illustrating the configuration of the tape archive system as an example of the embodiment.

FIGS. 1 and 2 are perspective views each illustrating a configuration of a tape archive system 1 as an example of the embodiment. In FIG. 2, an accommodation shelf 10R of FIG. 1 is removed.

The tape archive system 1 is a storage system, which is provided as an external storage device that backs up data (object data) in a computer system, and accommodates a large number of cartridge type recording devices (portable recording media). Examples of the portable recording medium include a magnetic tape cartridge, a flexible disk, an optical disc, and a magnetic tape wound around a reel. In the present embodiment, a case will be described where a magnetic tape cartridge using a magnetic tape that is a sequential medium as a recording medium is used as the portable recording medium. The magnetic tape cartridge accommodates the recording medium such as a magnetic recording tape inside. The magnetic tape is a tape-like recording medium (tape medium) that stores data in a sequentially readable and writable manner. Note that, hereinafter, the magnetic tape may be simply referred to as a tape, and the magnetic tape cartridge may be simply referred to as a cartridge.

As illustrated in FIG. 1, the tape archive system 1 includes a plurality of (three in the example illustrated in FIG. 1) accommodation shelves 10R, 10L, and 10B, a plurality of (four in the example illustrated in FIG. 2) drive devices 12, and two robots 11a and 11b.

Each of the accommodation shelves 10R, 10L, and 10B accommodates cartridges, and includes a plurality of cells (accommodation cells) 14 formed in a matrix as an accommodation space divided into a plurality of sections for accommodating the cartridges.

In the example illustrated in FIG. 1, the accommodation shelves 10R, 10L, and 10B are arranged so as to surround the robots 11a and 11b from three directions, the accommodation shelf 10L is arranged on the opposite side of the accommodation shelf 10R, and the accommodation shelf 10B is arranged on one surface orthogonal to the accommodation shelves 10R and 10L.

The plurality of (four in the example illustrated in FIG. 2) drive devices 12 is installed on the rear accommodation shelf 10B.

The drive device 12 is a data writing/reading unit that writes and reads data to and from a tape in a cartridge. In the example illustrated in FIG. 2, the four drive devices 12 are arranged in a matrix below a cell group of the accommodation shelf 10B.

A library device 60 (see FIG. 3) includes the robots 11a and 11b that convey a cartridge as an object to be conveyed.

The robots 11a and 11b are conveyance units that conveys a cartridge from a cartridge access station (CAS) (not illustrated) to an accommodation shelf 10, or conveys a cartridge from the accommodation shelf 10 to the drive device 12, and conveys a cartridge from the drive device 12 to the accommodation shelf 10. One of the robots 11a and 11b is set as an operation robot, and the other robot is used as a standby robot used in a case where an abnormality occurs in the operation robot. Hereinafter, the robots 11a and 11b will be referred to as a robot 11 in a case where they are not particularly distinguished.

In the tape archive system 1, by using the robot 11, a cartridge is taken out from the cell 14 of the accommodation shelf 10 and conveyed to and mounted in any one of the four drive devices 12, and writing or reading of data is executed. In addition, a cartridge for which writing or reading of data has been completed is taken out from the drive device 12, conveyed by the robot 11, and accommodated in the cell 14 of the accommodation shelf 10.

Next, a control system in the tape archive system 1 will be described with reference to FIGS. 3 and 4.

Figure 3:
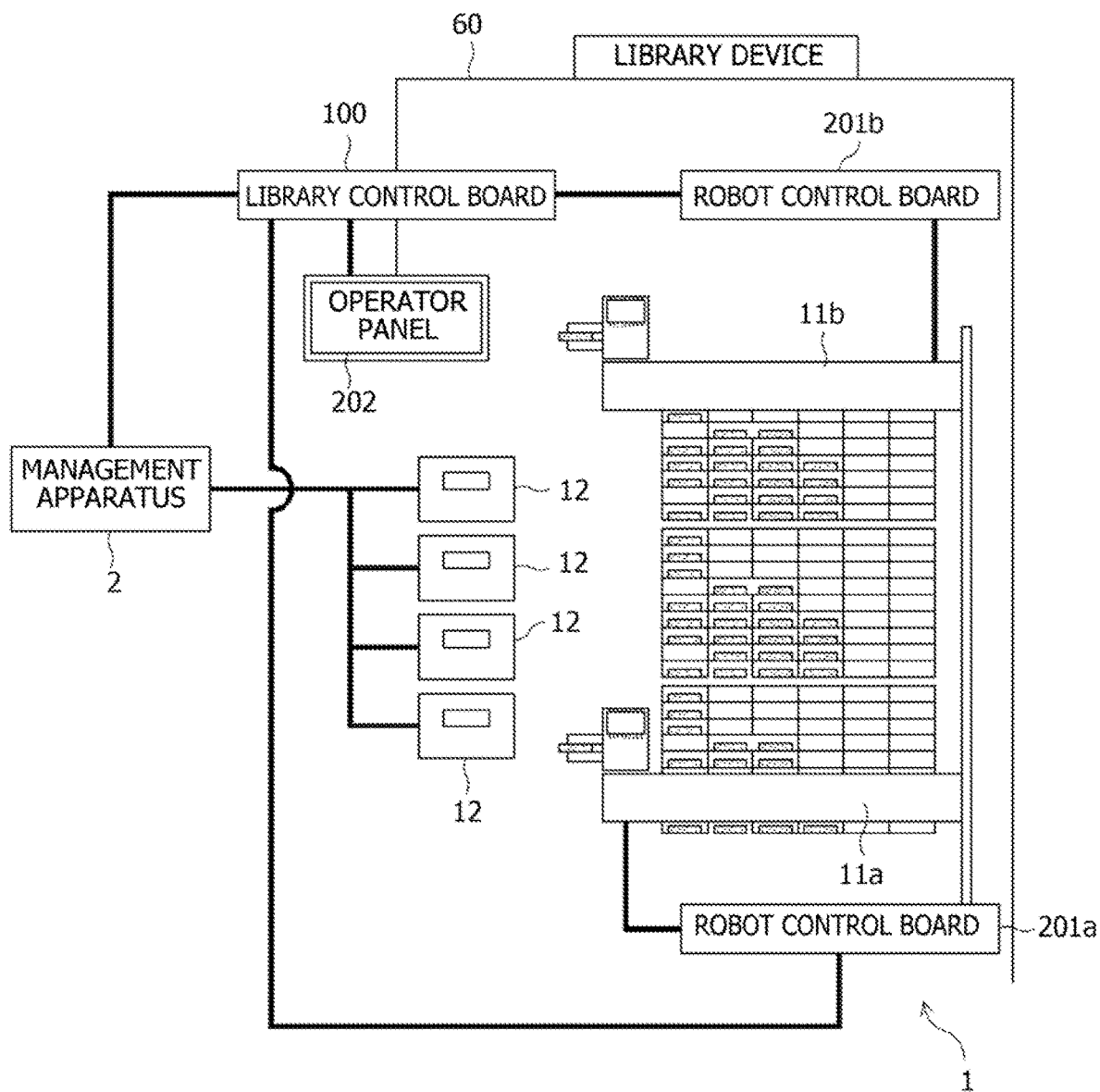
FIG. 3 is a diagram illustrating a hardware configuration example of a control system in the tape archive system as an example of the embodiment.

FIG. 3 is a diagram illustrating a hardware configuration example of the control system in the tape archive system 1 as an example of the embodiment.

Note that, in the drawing, the same parts are denoted by the same reference numerals. In addition, in the drawing, similar parts to the aforementioned parts are denoted by the same reference numerals as those of the aforementioned parts, and thus detailed description thereof will be omitted.

As illustrated in FIG. 3, the library device 60 of the tape archive system 1 includes robot control boards 201a and 201b and a library control board 100. The robot control board 201a controls the robot 11a, and the robot control board 201b controls the robot 11b.

The robot control boards 201a and 201b have a similar configuration. Hereinafter, the robot control boards 201a and 201b will be referred to as a robot control board 201 in a case where they are not particularly distinguished. The control of the robot 11 by the robot control board 201 may be implemented by a known method, and the description thereof will be omitted.

The library control board 100 controls all systems in the tape archive system 1. To the library control board 100, an operator panel 202 and a management apparatus 2 are connected. The operator panel 202 is an information input/output unit, and an operator operates the operator panel 202 to input and output information.

The library control board 100 exercises control such as reading or writing of information from or to a recording medium of a cartridge designated by the management apparatus 2.

The management apparatus 2 is connected to each drive device 12 and executes writing or reading of information to or from a recording medium of a cartridge mounted in the drive device 12.

Figure 4:
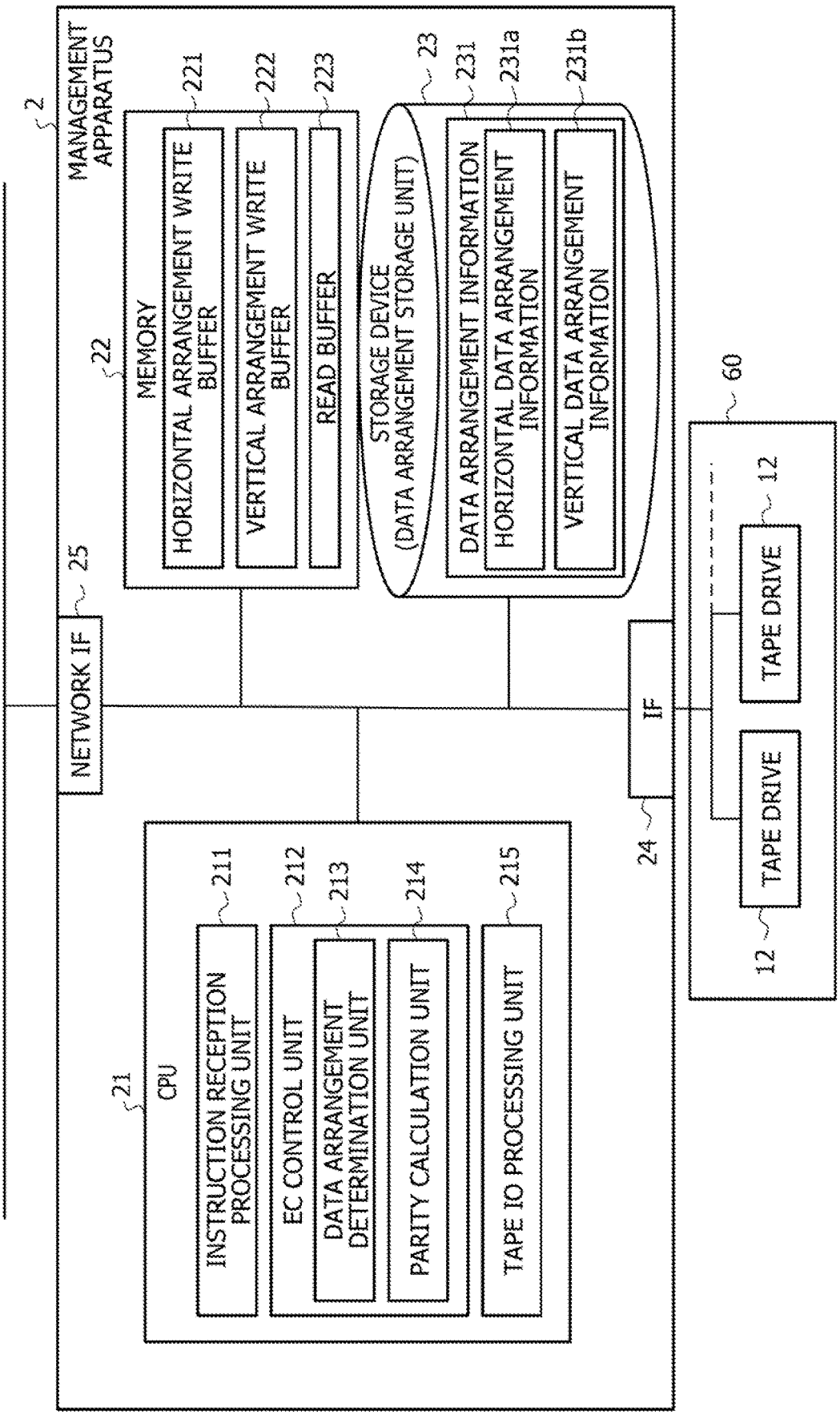
FIG. 4 is a diagram illustrating a functional configuration example of a management apparatus of the tape archive system as an example of the embodiment.

FIG. 4 is a diagram illustrating a functional configuration example of the management apparatus 2 of the tape archive system 1 as an example of the embodiment.

The management apparatus 2 is, for example, an information processing apparatus having a server function (server computer), and includes, as illustrated in FIG. 4, a central processing unit (CPU) 21, a memory 22, a storage device 23, a network interface (IF) 25, and an interface (IF) 24.

The network interface 25 is connected to a network (not illustrated). The network interface 25 exchanges data with a host device or another computer or communication device (not illustrated) via the network. That is, for example, the network interface 25 receives a command (instruction) transmitted from the host device via the network and instructing data access such as reading or writing from or to a tape.

The storage device 23 is a storage device such as a hard disk drive (HDD), a solid state drive (SSD), or a storage class memory (SCM), and stores various data.

The storage device 23 stores data arrangement information 231 (horizontal data arrangement information 231a and vertical data arrangement information 231b) created by a data arrangement determination unit 213 to be described later. The data arrangement information 231 is information indicating a storage position of a data block on one or more tapes, and details of the data arrangement information 231 will be described later.

The memory 22 is a storage memory such as a read only memory (ROM) and a random access memory (RAM). In the ROM of the memory 22, a software program (data management program) relating to tape archive control and data or the like for the program are written. The software program in the memory 22 is appropriately read and executed by the CPU 21. In addition, the RAM of the memory 22 is used as a primary storage memory or a working memory.

Furthermore, a storage area of the RAM of the memory 22 is also used as a horizontal arrangement write buffer 221, a vertical arrangement write buffer 222, and a read buffer 223.

As will be described later, the horizontal arrangement write buffer 221 temporarily stores object data when an EC control unit 212 archives the object data in a horizontal arrangement method.

As will be described later, the vertical arrangement write buffer 222 temporarily stores object data when the EC control unit 212 archives the object data in a vertical arrangement method.

The read buffer 223 temporarily stores data (archive data) read from a tape.

The storage device 23 or the ROM of the memory 22 may store a driver program (driver) for the drive device 12, which is executed by a tape input/output (10) processing unit 215 to be described later.

The IF 24 is an interface for connecting an external device to the management apparatus 2, and is, for example, a universal serial bus (USB) interface or a peripheral component interconnect express (PCIe) interface. In addition, the IF 24 may be a local area network (LAN) interface. One or more drive devices 12 are connected to the IF 24.

The CPU 21 is a processing device that performs various types of control and calculation, and implements various functions by executing an operating system (OS) and programs stored in the memory 22 or the like. As illustrated in FIG. 4, the CPU 21 implements functions as an instruction reception processing unit 211, the EC control unit 212, and the tape IO processing unit 215.

In addition, the CPU 21 of the management apparatus 2 functions as the instruction reception processing unit 211, the EC control unit 212, and the tape IO processing unit 215 by executing the data management program.

Note that the program (data management program) for implementing the functions as the instruction reception processing unit 211, the EC control unit 212, and the tape IO processing unit 215 is provided, for example, in a form recorded in a computer-readable recording medium such as a flexible disk, a compact disc (CD) (CD-ROM, CD-R, CD-RW, or the like), a digital versatile disc (DVD) (DVD-ROM, DVD-RAM, DVD-R, DVD+R, DVD-RW, DVD+RW, HD DVD, or the like), a Blu-ray disc, a magnetic disc, an optical disc, or a magneto-optical disc. Then, the computer reads the program from the recording medium, transfers the program to an internal storage device or an external storage device, and stores the program for use. In addition, for example, the program may be recorded in a storage device (recording medium) such as a magnetic disc, an optical disc, or a magneto-optical disc, and provided from the storage device to the computer via a communication path.

When the functions as the instruction reception processing unit 211, the EC control unit 212, and the tape IO processing unit 215 are implemented, the program stored in the internal storage device (the RAM or the ROM of the memory 22 in the present embodiment) is executed by a microprocessor (the CPU 21 in the present embodiment) of the computer. At this time, the computer may read and execute the program recorded in the recording medium.

The instruction reception processing unit 211 accepts a data access command transmitted from the host device and received by the network interface 25.

For example, when object data and a command (data access command) for instructing archiving of the object data on a tape are transmitted from the host device, the instruction reception processing unit 211 processes the object data and the command. The instruction reception processing unit 211 stores the received object data and data access command in a predetermined storage area of the memory 22.

In addition, for example, when a command (data access command) for instructing reading of data archived on a tape is transmitted from the host device, the instruction reception processing unit 211 stores the data access command in a predetermined storage area of the memory 22. The instruction reception processing unit 211 corresponds to a reception processing unit that receives an instruction to write a plurality of pieces of writing data (object data).

The tape IO processing unit 215 operates each drive device 12 by executing the driver of the drive device 12. As a result, the tape IO processing unit 215 executes reading or writing data form or to a tape mounted in the drive device 12. The tape IO processing unit 215 functions as a driver execution unit that executes the driver of the drive device 12.

The tape IO processing unit 215 writes a data block to each position on a tape, which is determined by the data arrangement determination unit 213 of the EC control unit 212. Hereinafter, writing object data to one or more tapes may be referred to as archiving.

In order to perform data access to a tape, the tape IO processing unit 215 also performs processing for causing, via the robot control board 201, the robot 11 to convey the target tape (cartridge tape) and mount the tape in the drive device 12. In addition, the tape IO processing unit 215 also performs processing such as searching for indexing positions of a tape by the drive device 12.

In addition, the tape IO processing unit 215 refers to the data arrangement information 231 of the storage device 23 in response to a command (data access command) for instructing reading of archived data, and grasps a tape in which data to be accessed (archive data) is stored and a position of a data block on the tape.

Then, the tape IO processing unit 1 reads or writes the data block from the grasped position on the tape.

The EC control unit 212 implements redundancy using a plurality of tapes by an EC method. As illustrated in FIG. 4, the EC control unit 212 has functions as the data arrangement determination unit 213 and a parity calculation unit 214.

When archiving object data on one or more tapes, the data arrangement determination unit 213 determines arrangement (writing position) of data to be written (object data) to the one or more tapes.

In the tape archive system 1, RAIT is implemented in which data blocks created by dividing object data and parity that is redundant data are stored in a plurality of tapes.

The data arrangement determination unit 213 compares a data size of object data with a predetermined threshold, and in a case where the data size is equal to or larger than the threshold, arranges a plurality of data blocks created by dividing the object data by the number corresponding to EC in a distributed manner on a plurality of tapes (a first archive method: horizontal arrangement method).

Hereinafter, a method in which object data is divided into a plurality of data blocks, and the data blocks are set as an EC set and archived (arranged) in a distributed manner on a plurality of tapes in a horizontal direction may be referred to as the horizontal arrangement method.

In the case where the data size of the object data is equal to or larger than the threshold, the data arrangement determination unit 213 determines to perform archiving by the horizontal arrangement method. The data arrangement determination unit 213 causes the horizontal arrangement write buffer 221 to store the object data.

In addition, in a case where the data size of the object data is less than the threshold, the data arrangement determination unit 213 arranges the object data on one tape without dividing the object data (a second archive method: vertical arrangement method). That is, for example, the data arrangement information 231 corresponds to an allocation processing unit that sets, as an EC set, two or more pieces of data each having a data size of less than the threshold among a plurality of pieces of object data (data), and allocates the two or more pieces of data to one tape medium among a plurality of tape media.

Hereinafter, a method in which object data is archived (arranged) on one tape without division may be referred to as the vertical arrangement method.

In the case where the data size of the object data is less than the threshold, the data arrangement determination unit 213 determines to perform archiving by the vertical arrangement method. The data arrangement determination unit 213 causes the vertical arrangement write buffer 222 to store the object data.

The data arrangement determination unit 213 selects either the first archive method or the second archive method in accordance with the data size of the object data, and archives the object data by the selected method.

Figure 5:
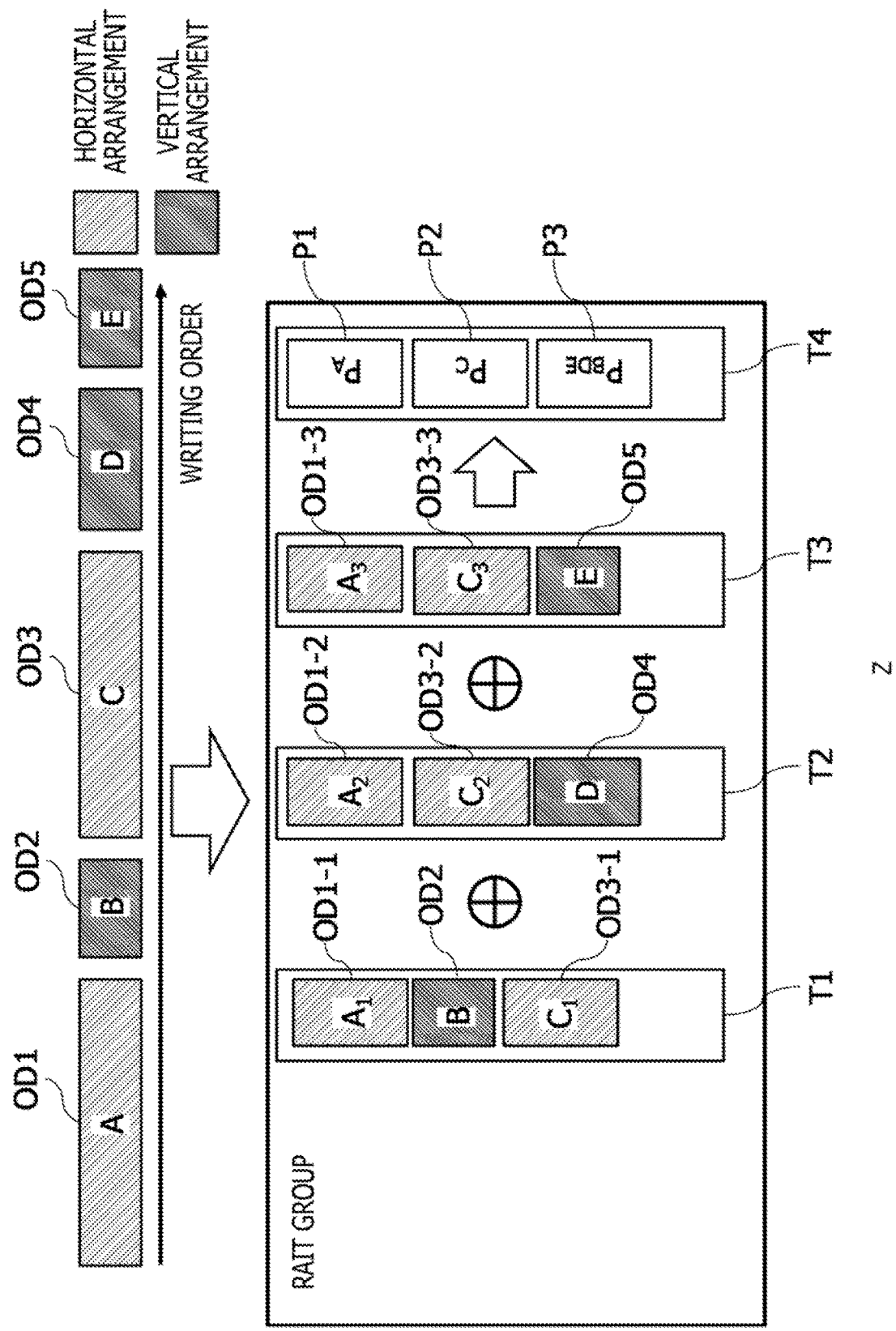
FIG. 5 is a diagram for describing processing by a data arrangement determination unit of the tape archive system as an example of the embodiment.

FIG. 5 is a diagram for describing processing by the data arrangement determination unit 213 of the tape archive system 1 as an example of the embodiment.

FIG. 5 illustrates an example in which object data OD1 to OD5 are archived on tapes T1 to T4. Note that the object data OD1 may be referred to as object data A. Similarly, the object data OD2, OD3, OD4, and OD5 may be referred to as object data B, C, D, and E, respectively.

The data arrangement determination unit 213 arranges the object data OD1 to OD5 on a tape in this order (writing order). In addition, the data arrangement determination unit 213 arranges each of the object data OD1 to OD5 on the tape sequentially from the head.

In addition, among the object data OD1 to OD5, the object data OD1 and OD3 each have a data size equal to or larger than the above-described threshold, and the object data OD2, OD4, and OD5 each have a data size less than the threshold.

Furthermore, FIG. 5 illustrates an example in which a RAIT group is formed by using the tapes T1 to T4, the tapes T1 to T3 are used for writing object data, and the tape T4 is used for writing parity. The data arrangement determination unit 213 repeatedly allocates the object data in rotation to the tapes T1 to T3 in this order.

For the object data OD1 and OD3 each having a data size larger than the threshold, the data arrangement determination unit 213 determines storage destinations so that, for example, the object data OD1 and OD3 are divided into a plurality of data blocks having the same data size and stored in a distributed manner in the tapes T1 to T3.

In the example illustrated in FIG. 5, the data arrangement determination unit 213 divides, for example, the object data OD1 into three data blocks $A_1$, $A_2$, and $A_3$ having a predetermined data size. The data arrangement determination unit 213 sequentially cuts out the object data OD1 from the head in units of a predetermined data length to generate the data blocks $A_1$, $A_2$, and $A_3$ in this order. Then, the data arrangement determination unit 213 sequentially allocates storage destinations of the generated data blocks $A_1$, $A_2$, and $A_3$ to the tapes T1 to T3 in rotation.

Note that, in FIG. 5, a direction in which the plurality of cartridge tapes T1 to T4 is arranged (left-right direction in FIG. 5) may be referred to as a horizontal direction, and a direction along each of the cartridge tapes T1 to T4 (up-down direction in FIG. 5) may be referred to as a vertical direction.

The data arrangement determination unit 213 implements striping by archiving (arranging) the plurality of data blocks created by dividing the object data having the data size equal to or larger than the threshold in a distributed manner on the plurality of tapes in the horizontal direction.

The data arrangement determination unit 213 performs processing such as division on the object data stored in the horizontal arrangement write buffer 221.

The data arrangement determination unit 213 compares the data size of the object data with a predetermined threshold, and in a case where the data size is equal to or larger than the threshold, archives the object data by the horizontal arrangement method. In addition, in a case where the data size of the object data is less than the threshold, the data arrangement determination unit 213 archives the object data by the vertical arrangement method.

In addition, the data arrangement determination unit 213 allocates parity P1 corresponding to the data blocks $A_1, A_2,$ and $A_3$ to the tape 14. The parity P1 corresponds to the object data A, and may be hereinafter referred to as parity $P_A$. The parity P1 is calculated by the parity calculation unit 214 to be described later.

Similarly, the data arrangement determination unit 213 sequentially cuts out the object data OD3 from the head in units of a predetermined data length to generate three data blocks $C_1, C_2,$ and $C_3$. Then, the data arrangement determination unit 213 allocates the generated data blocks $C_1, C_2,$ and $C_3$ in this order to the tapes T1 to T3 in rotation. The predetermined data length is calculated, for example, by dividing the data size of the object data by the number corresponding to EC.

In addition, the data arrangement determination unit 213 allocates parity P2 corresponding to the data blocks $C_1, C_2,$ and $C_3$ to the tape T4. The parity P2 corresponds to the object data C, and may be hereinafter referred to as parity $P_C$. The parity P2 is also calculated by the parity calculation unit 214.

Furthermore, the data arrangement determination unit 213 arranges, on one tape, the object data OD2, OD4, and OD5 each having a data size less than the threshold. In addition, the data arrangement determination unit 213 allocates parity P3 corresponding to the object data OD2, OD4, and OD5 (B, D, and E) to the tape T4. The parity P3 corresponds to the object data B, D, and E, and may be hereinafter referred to as parity $P_{BDE}$. The parity P3 is also calculated by the parity calculation unit 214 to be described later.

The data arrangement determination unit 213 processes the object data OD1 to OD5 in writing order. The writing order of the object data OD1 to OD5 may be managed by, for example, a queue.

The data arrangement determination unit 213 first processes the object data OD1. As a result, the data block $A_1$ is allocated to the tape T1, the data block $A_2$ is allocated to the tape T2, and the data block $A_3$ is allocated to the tape T3. Next, the data arrangement determination unit 213 allocates the parity P1 corresponding to the data blocks $A_1, A_2,$ and $A_3$ to the tape T4.

Next, the data arrangement determination unit 213 allocates the object data OD2 to the tape T1, and then allocates the data blocks $C_1, C_2,$ and $C_3$ of the object data OD3 to the tapes T1, T2, and T3, respectively. In addition, the data arrangement determination unit 213 allocates the parity P2 corresponding to the data blocks $C_1, C_2,$ and $C_3$ to the tape T4.

Thereafter, the data arrangement determination unit 213 allocates the object data OD4 to the tape T2, and then allocates the object data OD5 to the tape T3. Furthermore, the data arrangement determination unit 213 allocates the parity P3 ($P_{BDE}$) corresponding to the object data B, D, and E to the tape T4.

The data arrangement determination unit 213 determines a storage position of each data block on the plurality of tapes and causes the storage device 23 to store the storage position as the data arrangement information 231. The data arrangement information 231 is information indicating the storage position of the data block on each tape. The data arrangement information 231 may include information specifying a tape in which a data block is stored and information specifying object data as a source of a data block.

The data arrangement information 231 includes the horizontal data arrangement information 231a and the vertical data arrangement information 231b.

Figure 6:
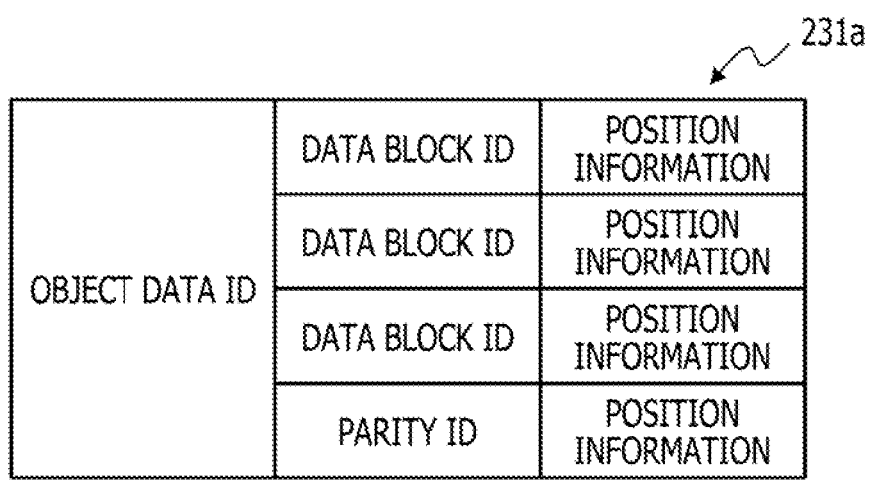
FIG. 6 is a diagram exemplifying a configuration of horizontal data arrangement information in the tape archive system as an example of the embodiment.

FIG. 6 is a diagram exemplifying a configuration of the horizontal data arrangement information 231a in the tape archive system 1 as an example of the embodiment.

The horizontal data arrangement information 231a indicates a position of object data (data block) arranged on a tape by the horizontal arrangement method.

The horizontal data arrangement information 231a exemplified in FIG. 6 is configured by associating a plurality of data block IDs, a parity ID, and position information with an object data ID.

The object data ID is identification information that specifies object data. The object data ID may be, for example, an object data name. The reference characters A to E in FIG. 5 each corresponds to the object data ID.

The data block ID is identification information that specifies a data block constituting the object data. The reference characters $A_1, A_2, A_3, C_1, C_2,$ and $C_3$ in FIG. 5 each corresponds to the data block ID.

The parity ID is identification information that specifies parity generated by the data block constituting the object data. The reference character $P_A$ in FIG. 5 corresponds to the parity ID.

The position information is information indicating a storage position of a data block or parity on a tape. The position information includes, for example, a cartridge ID that specifies a cartridge tape and a logical address in the tape.

Figure 7:
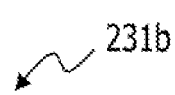
FIG. 7 is a diagram exemplifying a configuration of vertical data arrangement information in the tape archive system as an example of the embodiment.

FIG. 7 is a diagram exemplifying a configuration of the vertical data arrangement information 231b in the tape archive system 1 as an example of the embodiment.

The vertical data arrangement information 231b indicates a position of object data (data block) arranged on a tape by the vertical arrangement method.

The vertical data arrangement information 231b exemplified in FIG. 7 is configured by associating a plurality of object data IDs, a parity ID, and position information with a group ID.

The group ID is identification information that specifies a group including a plurality of pieces of object data written to the same tape. The group ID may be, for example, a group name. The "RAIT group" in FIG. 5 corresponds to the group ID.

The object data ID is identification information that specifies object data. The object data ID may be, for example, an object data name. The reference characters A to E in FIG. 5 each corresponds to the object data ID.

The data block ID is identification information that specifies a data block constituting the object data. The reference characters $A_1, A_2, A_3, C_1, C_2,$ and $C_3$ in FIG. 5 each corresponds to the data block. ID.

The parity ID is identification information that specifies parity generated by the object data included in the group. The reference character $P_{BDE}$ in FIG. 5 corresponds to the parity ID.

The position information is information indicating a storage position of a data block or parity on a tape. The position information includes, for example, a cartridge ID that specifies a cartridge tape and a logical address in the tape.

In addition, in the data arrangement information 231, information indicating whether the object data is archived by the horizontal arrangement method or the vertical arrangement method is stored in association with the object data.

A position of a data block on a tape in the data arrangement information 231 may be represented by, for example, a distance from the head of the tape. Alternatively, the position of the data block may be represented by a data size of the data block and the storage order from the head of the tape, and various modifications may be made.

In addition, the data arrangement information 231 also includes information that specifies a tape in which parity is stored and information that indicates a storage position of each parity on a tape.

Note that the data arrangement information 231 may be recorded in a non-volatile memory included in a cartridge tape.

Figure 8:
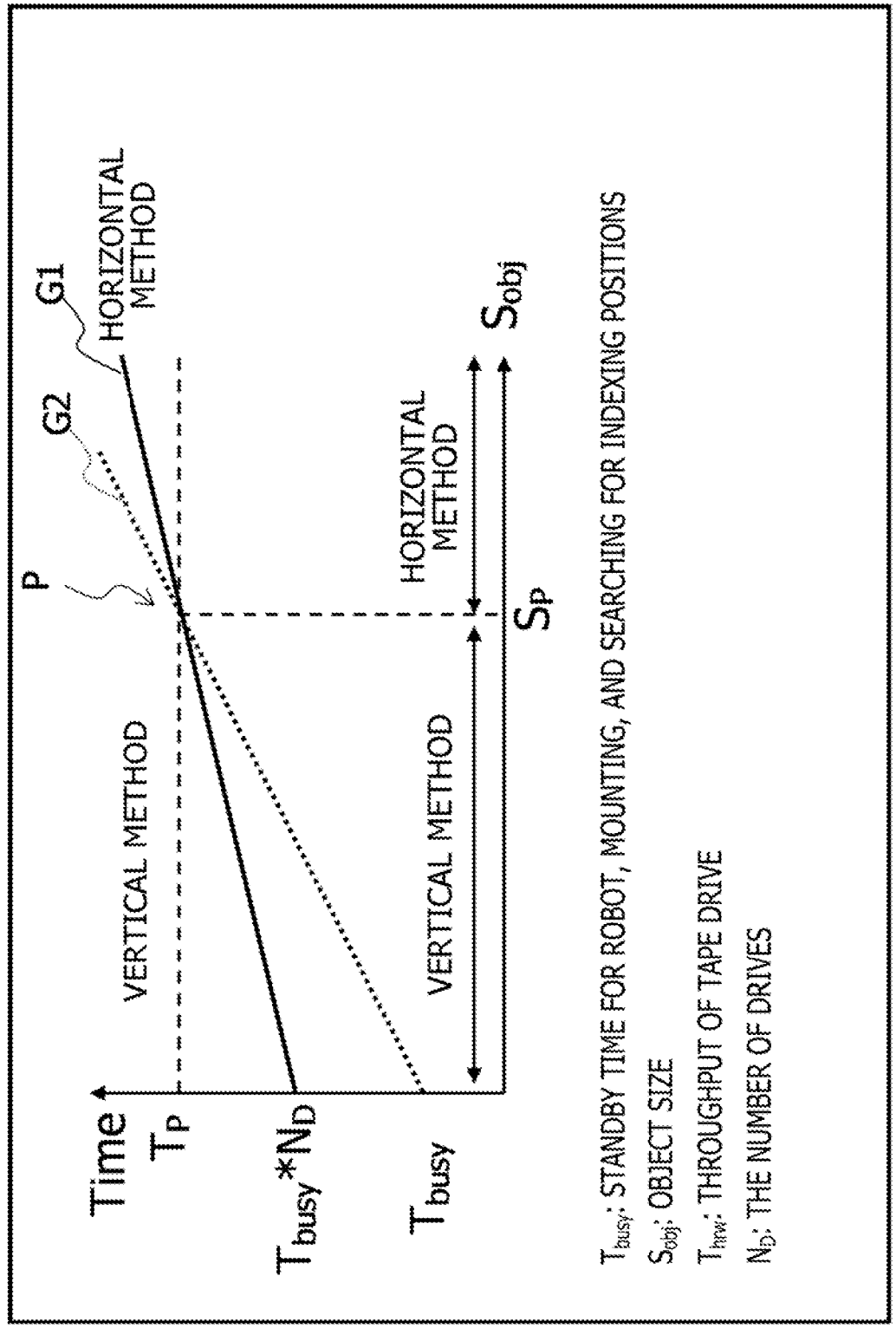
FIG. 8 is a diagram for describing a threshold used by the data arrangement determination unit of the tape archive system as an example of the embodiment.

FIG. 8 is a diagram for describing the threshold used by the data arrangement determination unit 213 of the tape archive system 1 as an example of the embodiment.

In FIG. 8, a coordinate space in which a horizontal axis represents a data size and a vertical axis represents time is illustrated, and two line graphs G1 and G2 are illustrated on the coordinate space.

The line graphs G1 and G2 indicate a relationship between the data size of object data and total usage time of the drive device taken to archive the object data.

In FIG. 8, $T_{busy}$ is time (standby time) taken to move the robot 11, mount a cartridge tape, and search for indexing positions of a tape, in the tape archive system 1. $S_{obj}$ is the size of the object data. $N_D$ is the number of the drive devices 12 (the number of drives) included in the tape archive system 1. $T_{hrw}$ is a throughput of the drive device 12. The $T_{hrw}$ corresponds to a reciprocal of slopes of the graphs G1 and G2.

The line graph G1 indicates a relationship between the data size of the object data and total usage time of ail the drive devices 12 used (total amount of time all the drive devices 12 were used), in the case of archiving the object data by the horizontal arrangement method.

In addition, the line graph G2 indicates a relationship between the data size of the object data and usage time of the drive device 12 in the case of writing the object data to a single tape by the vertical arrangement method.

In the example illustrated in FIG. 8, the line graph G1 and the line graph G2 intersect at a point P(Sp, Tp). When the data size is less than a threshold Sp, the total usage time of the drive device 12 is shorter in the vertical arrangement method than that in the horizontal arrangement method. On the other hand, when the data size is equal to or larger than a threshold Sp, the total usage time of the drive device 12 is shorter in the horizontal arrangement method than that in the vertical arrangement method.

At the point P, the total usage time of the drive device 12 is equal in the vertical arrangement method and the horizontal arrangement method.

The data arrangement information 231 uses a value of the data size Sp at the coordinates (Sp, Tp) of the intersection P between the line graph G1 and the line graph G2 as the threshold used by the data arrangement determination unit 213 for determining the archive method (horizontal arrangement method or vertical arrangement method).

Sp of the point P corresponds to the data size of the data in a case where the usage time of the drive device 12 taken to write the object data to one tape by the vertical arrangement method matches the total usage time of the plurality of the drive devices taken to write a plurality of data blocks constituting the object data to a plurality of tapes by the horizontal arrangement method.

Note that it is desirable to store the value of the threshold Sp in the storage device 23 or the ROM of the memory 22 in advance.

The data arrangement determination unit 213 selects an archive method having shorter total usage time of the drive device 12 from the horizontal arrangement method and the vertical arrangement method, and archives the object data on the tape. Specifically, for example, the data arrangement determination unit 213 exercises control such that object data having a data size less than the threshold Sp is written to one tape by the vertical arrangement method, and object data having a data size equal to or larger than the threshold Sp is written to a plurality of tapes by the horizontal arrangement method.

The parity calculation unit 214 calculates parity of object data. The parity calculation unit 214 calculates parity in accordance with the archive method of the object data on a tape.

That is, for example, for object data divided into a plurality of data blocks and arranged in a distributed manner on a plurality of tapes by the horizontal arrangement method, the parity calculation unit 214 calculates parity for each object data. That is, for example, the parity calculation unit 214 corresponds to an error correction information calculation unit that calculates error correction information (parity) among the plurality of data blocks created by dividing the same object data (data). The parity calculation unit 214 calculates parity in units of a block obtained by dividing the object data.

For example, in the example illustrated in FIG. 5, the parity P1 is calculated on the basis of the data blocks $A_1, A_2$, and $A_3$. The number of data blocks used for calculating parity in this way may be referred to as a RAIT rank or a RAIT rank number. In the example illustrated in FIG. 5, since the parity P1 is calculated on the basis of the data blocks $A_1$, $A_2$, and $A_3$, the RAIT rank is 3.

On the other hand, for object data arranged on one tape by the vertical arrangement method, the parity calculation unit 214 calculates parity among a plurality of pieces of object data arranged on one tape by the vertical arrangement method. The parity calculation unit 214 corresponds to the error correction information calculation unit that calculates error correction information (parity) between two or more pieces of data allocated to one tape medium.

The parity calculation unit 214 calculates parity using object data stored in the horizontal arrangement write buffer 221 and the vertical arrangement write buffer 222.

(B) Operation

Figure 9:
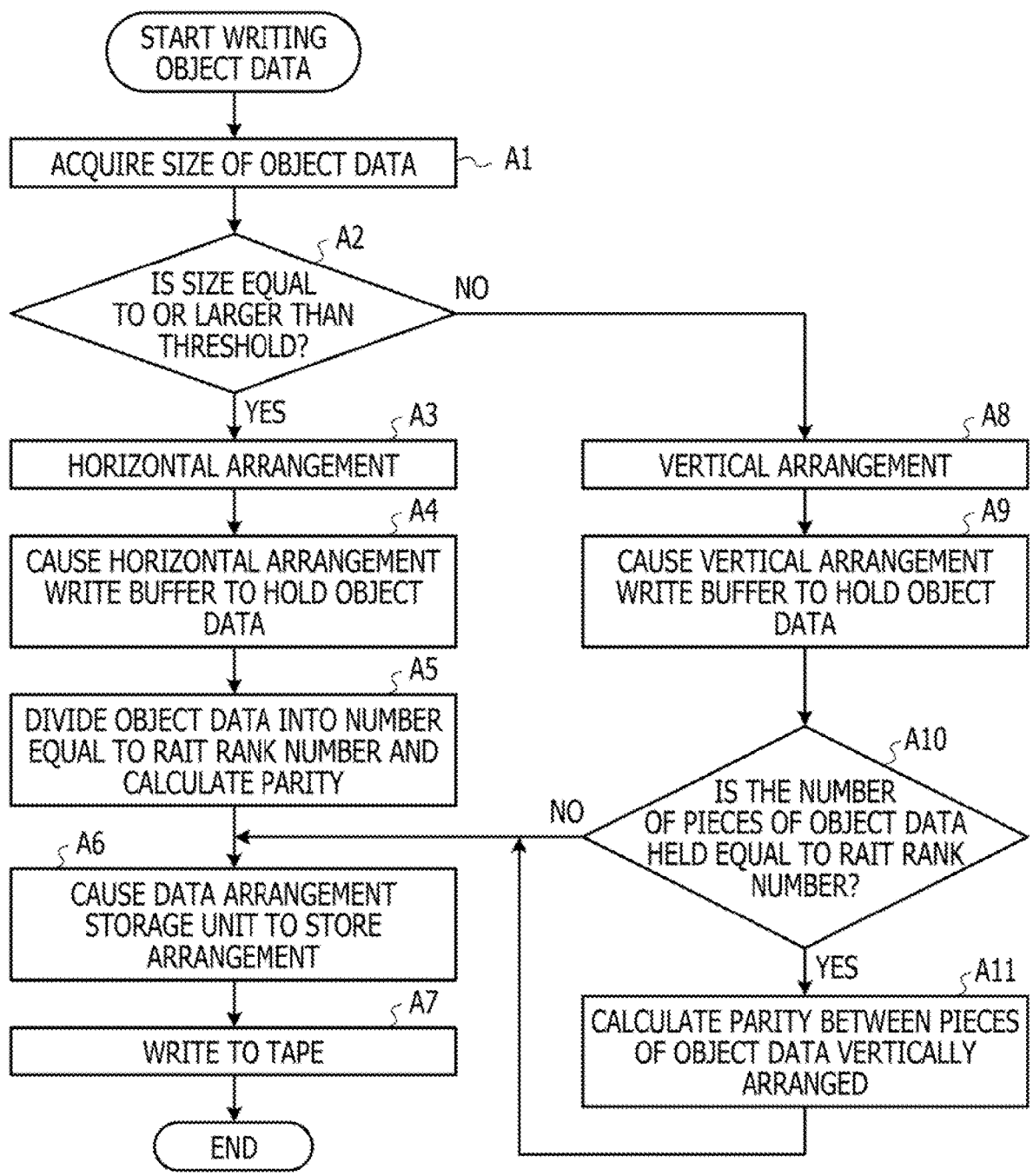
FIG. 9 is a flowchart for describing processing when object data is archived on a tape in the tape archive system as an example of the embodiment.
Figure 10:
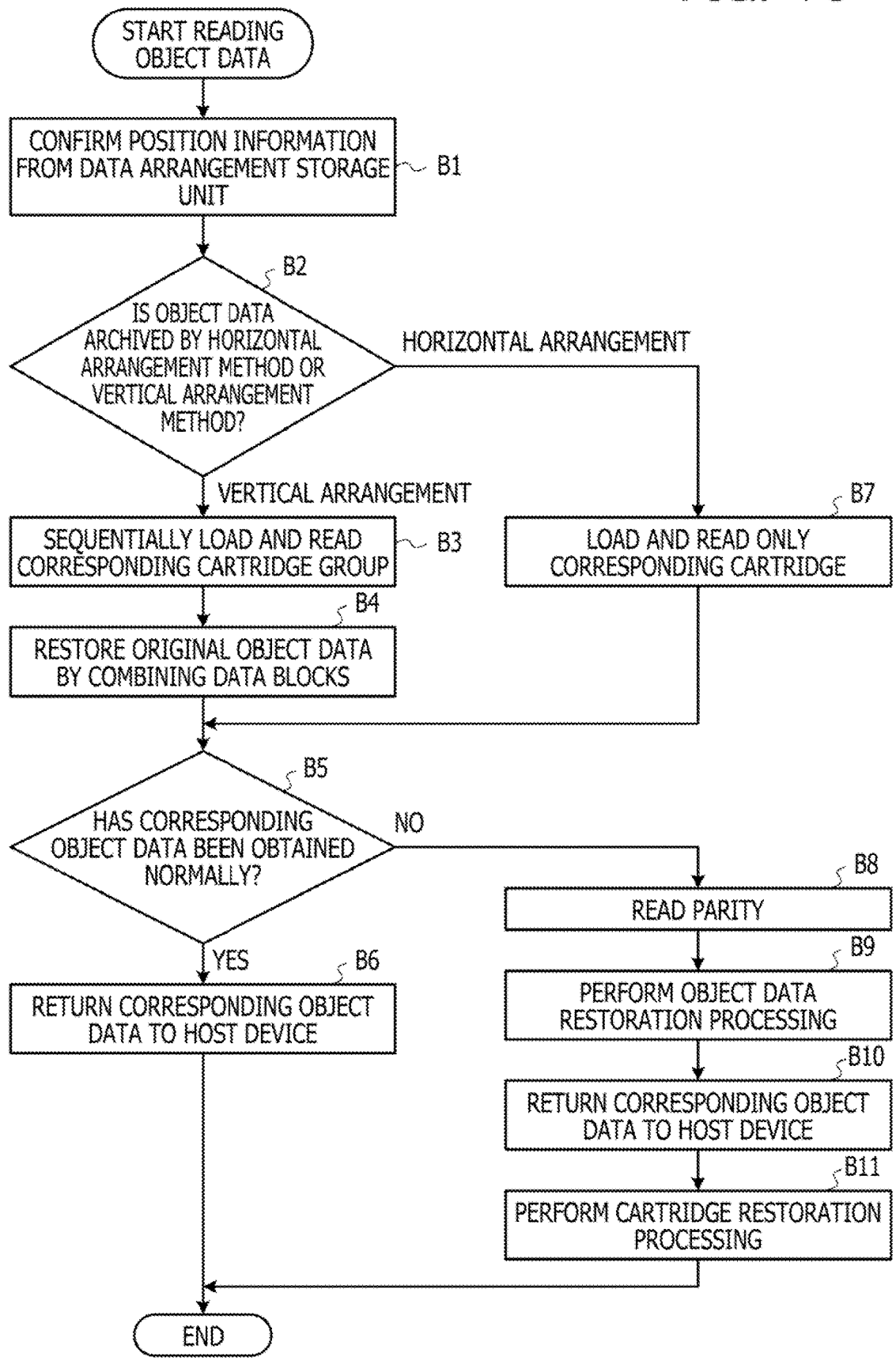
FIG. 10 is a flowchart for describing processing when data archived on a tape is read in the tape archive system as an example of the embodiment.

With reference to a flowchart (Steps A1 to A11) illustrated in FIG. 9, processing when object data is archived on a tape in the tape archive system 1 as an example of the embodiment configured as described above will be described.

In the management apparatus 2, the instruction reception processing unit 211 receives, from the host device (not illustrated), object data and an instruction to archive the object data on a tape.

In Step A1, the data arrangement determination unit 213 acquires a data size of the object data.

In Step A2, the data arrangement determination unit 213 compares the data size of the object data with the threshold Sp. In a case where the data size of the object data is equal to or larger than the threshold Sp (see a YES route in Step A2), the data arrangement determination unit 213 determines the horizontal arrangement method as the archive method in Step A3.

In Step A4, the data arrangement determination unit 213 causes the horizontal arrangement write buffer 221 to hold (store) the object data.

In Step A5, the parity calculation unit 214 divides the object data into the number equal to the RAIT rank number to create data blocks, and calculates parity using the data blocks in the number equal to the RAIT rank number.

In Step A6, the data arrangement determination unit 213 determines a storage position of each data block on a plurality of tapes and a storage position of corresponding parity, and causes the storage device 23 to store the storage positions as the data arrangement information 231.

In the case where the data blocks are arranged on the plurality of tapes by the horizontal arrangement method, the data arrangement determination unit 213 causes the storage device 23 to store the horizontal data arrangement information 231a.

In Step A7, the tape IO processing unit 215 sets, as a RAIT set, the plurality of data blocks constituting the object data and the corresponding parity, and writes the plurality of data blocks and the corresponding parity to each tape as an archive destination while confirming the storage position with reference to the data arrangement information 231. Thereafter, the processing ends.

In addition, in a case where the data size of the object data is less than the threshold as a result of the confirmation in Step A2 (see a NO route in Step A2), the data arrangement determination unit 213 determines the vertical arrangement method as the archive method in Step A8.

In Step A9, the data arrangement determination unit 213 causes the vertical arrangement write buffer 222 to hold the object data.

In Step A10, the parity calculation unit 214 confirms whether the number of pieces of the object data held in the vertical arrangement write buffer 222 is equal to the RAIT rank number. In a case where the number of pieces of the object data held in the vertical arrangement write buffer 222 is less than the RAIT rank number as a result of the confirmation (see a NO route in Step A10), the processing proceeds to Step A6.

On the other hand, in a case where the number of pieces of the object data held in the vertical arrangement write buffer 222 is equal to the RAIT rank number as a result of the confirmation in Step A10 (see a YES route in Step A10), the processing proceeds to Step A11.

In Step A11, the parity calculation unit 214 calculates parity by using, as a RAIT set, the object data in the number equal to the RAIT rank number stored in the vertical arrangement write buffer 221. The RAIT set is formed by the object data in the number equal to the RAIT rank number and the parity. Thereafter, the processing proceeds to Step A6.

In Step A6, the data arrangement determination unit 213 determines a storage position of each of the pieces of object data in the number equal to the RAIT rank number on one tape and a storage position of corresponding parity, and causes the storage device 23 to store the storage positions as the data arrangement information 231. In the case where the object data blocks are arranged on one tape by the vertical arrangement method, the data arrangement determination unit 213 causes the storage device 23 to store the vertical data arrangement information 231b.

With reference to a flowchart (Steps B1 to B11) illustrated in 10, processing when data archived on a tape is read in the tape archive system 1 as an example of the embodiment configured as described above will be described.

In the management apparatus 2, the instruction reception processing unit 211 receives, from the host device (not illustrated), an instruction to read object data archived on a tape.

In Step B1, the tape IO processing unit 215 confirms, with reference to the data arrangement information 231, a tape in which a data block of the object data to be read is stored and information regarding a storage position of the data block on the tape.

In Step B2, the tape IO processing unit 215 confirms, with reference to the data arrangement information 231, whether the object data to be read is archived by the horizontal arrangement method or the vertical arrangement method. In a case where the object data is archived by the horizontal arrangement method (see a "horizontal arrangement" route in Step B2), the processing proceeds to Step B3.

In Step B3, the tape IO processing unit 215 specifies, with reference to the data arrangement information 231, a plurality of cartridge tapes (cartridge tape group) in which data blocks constituting the object data are stored. The tape IO processing unit 215 uses the robot 11 and the drive device 12 to sequentially load the cartridge tapes and read each data block constituting the object data to the read buffer 223.

In Step B4, the tape IO processing unit 215 restores the object data by combining the read plurality of data blocks.

In Step B5, the tape IO processing unit 215 confirms whether the object data to be read has been restored normally. In a case where the object data has been obtained normally (see a YES route in Step B5), the processing proceeds to Step B6.

In Step B6, the tape IO processing unit 215 returns the generated object data to the host device, and the processing ends.

In addition, in a case where the object data is archived by the vertical arrangement method as a result of the confirmation in Step B2 (see a "vertical arrangement" route in Step B2), the processing proceeds to Step B7.

In Step B7, only the tape on which the object data is archived is loaded and the object data is read to the read buffer 223. Thereafter, the processing proceeds to Step B5.

In addition, in a case where the object data to be read has not been obtained normally as a result of the confirmation in Step B5 (see a NO route in Step B5), the processing proceeds to Step B8.

In Step B8, the EC control unit 212 confirms, with reference to the data arrangement information 231, a tape in which parity corresponding to the object data to be read is stored and a storage position of the parity on the tape. Then, the EC control unit 212 reads the parity corresponding to the object data to be read via the tape IO processing unit 215.

In Step B9, the EC control unit 212 restores the object data to be read using the read parity.

In Step B10, the restored object data to be read is returned to the host device.

In Step B11, a cartridge tape is restored by preparing a new cartridge tape in place of a failed cartridge tape, restoring all data of the failed cartridge from other cartridges and parity, and writing the data to the new cartridge tape.

(C) Effect

As described above, according to the tape archive system 1 as an example of the embodiment, the data arrangement determination unit 213 allocates, by the vertical arrangement method, object data having a data size less than a threshold to one of a plurality of tapes for which RAIT is set. With this configuration, reading of the object data may be implemented by accessing one tape, and data access time may be shortened.

In addition, the data arrangement determination unit 213 divides object data having a data size equal to or larger than the threshold into two or more data blocks, and allocates, by the horizontal arrangement method, the data blocks to two or more tapes among the plurality of tapes for which RAIT is set. Then, by reading and writing the two or more tapes in parallel using two or more of the drive devices 12, the data access time may be shortened.

In addition, the data arrangement determination unit 213 allocates a plurality of pieces of object data each having a data size less than the threshold to one of the plurality of tapes for which RAIT is set. The parity calculation unit 214 calculates parity using the plurality of pieces of object data allocated to the same tape, and allocates the parity to a tape different from the tape to which the pieces of object data are written.

Furthermore, the data arrangement determination unit 213 allocates a plurality of data blocks created by dividing a plurality of pieces of object data each having a data size equal to or larger than the threshold to a plurality of tapes among the plurality of tapes for which RAIT is set. The parity calculation unit 214 calculates parity using a plurality of data blocks constituting the same object data, and allocates the parity to a tape different from the tape to which the data blocks are written.

With these configurations, even in a case where an abnormality is detected in object data read from a tape, the object data may be restored using parity, so that reliability may be improved.

The data arrangement determination unit 213 selects an archive method having shorter total usage time of the drive device 12 from the horizontal arrangement method and the vertical arrangement method, and archives object data on a tape. With this configuration, data access time to object data may be surely shortened and data access performance may be improved.

Figure 11:
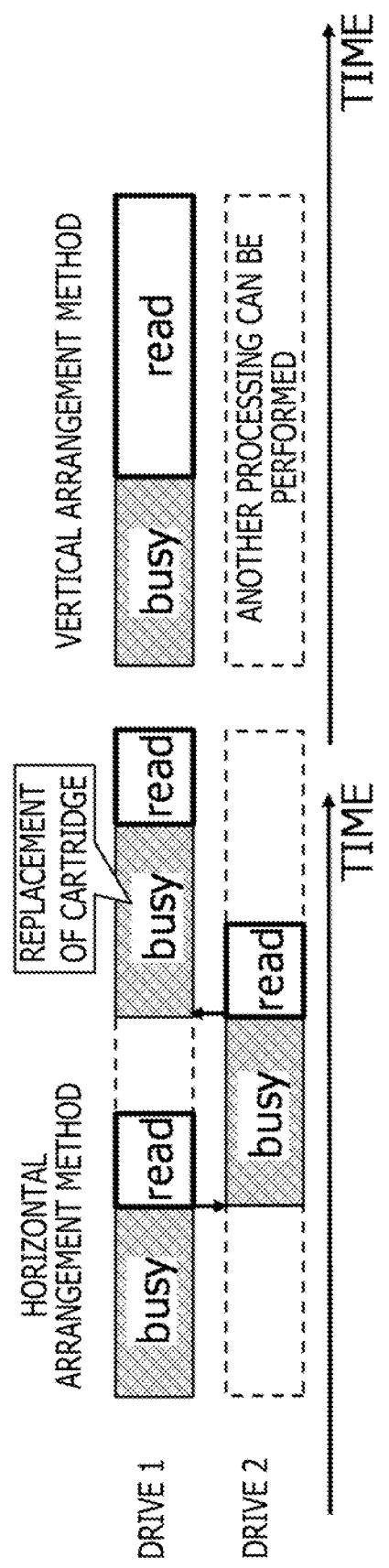
FIG. 11 is a diagram for describing an effect in the tape archive system as an example of the embodiment.
Figure 12:
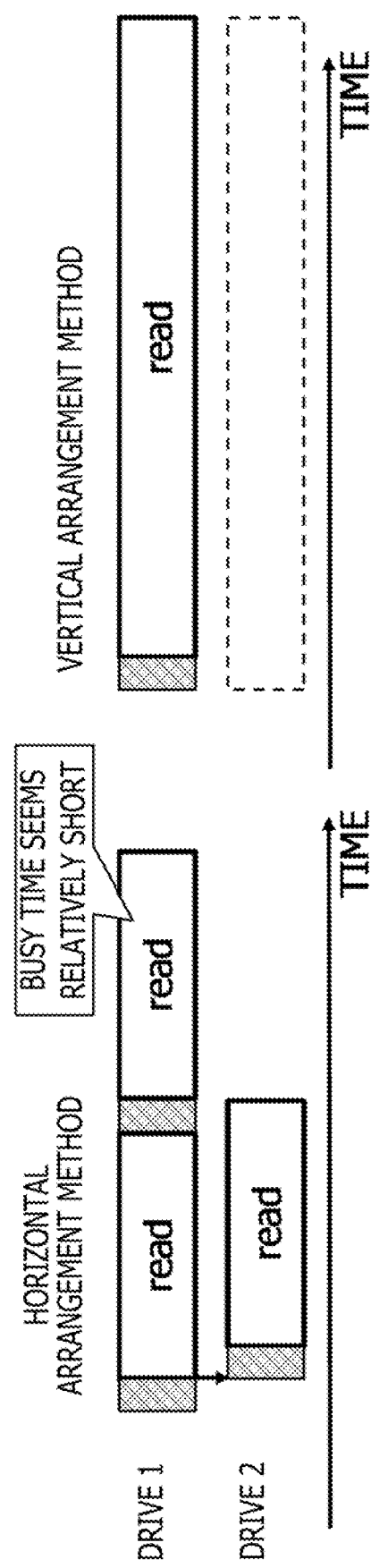
FIG. 12 is a diagram for describing an effect in the tape archive system as an example of the embodiment.
Figure 13:
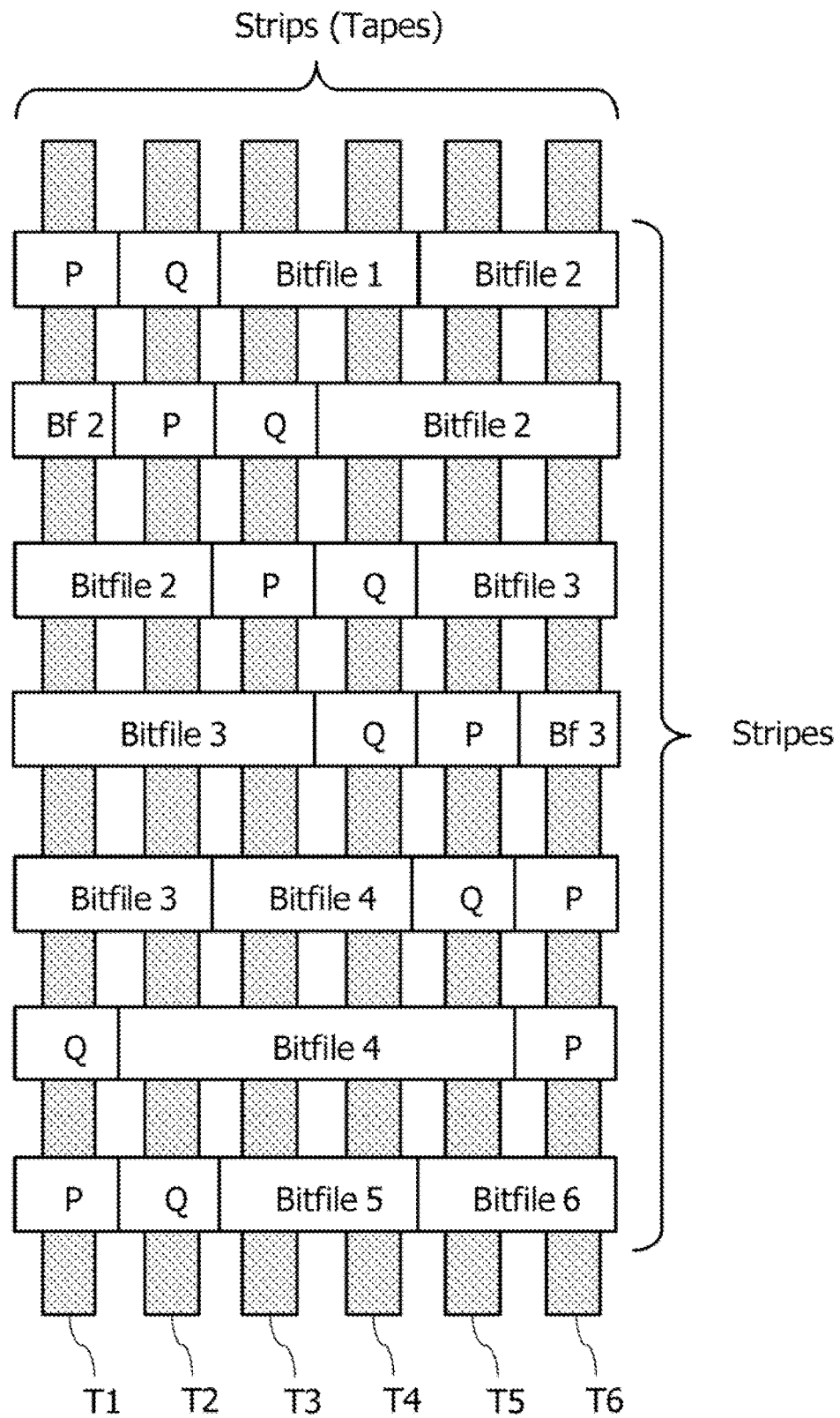
FIG. 13 is a diagram for describing a method of using a plurality of cartridge tapes by conventional RAIT.

FIGS. 11 and 12 are diagrams for describing effects in the archive system 1 as an example of the embodiment.

In FIGS. 11 and 12, time taken to perform read access on a cartridge tape is represented by blank squares (read), and time other than the read access time, such as robot standby time, mount time, and seek time, is represented by shaded squares (busy). The time other than the read access time includes time for replacing the cartridge tape.

In addition, FIGS. 11 and 12 illustrate an example in which two of the drive devices 12 are used.

FIG. 11 illustrates an arrangement state of data on a tape by the horizontal arrangement method and an arrangement state of data on a tape by the vertical arrangement method, in a case where a data size (object size) of object data is small.

As illustrated in FIG. 11, in the case where the data size of the object data is small, in the horizontal arrangement method, busy time accounts for a large proportion of data access time, and efficiency of read access to the tape is low.

In contrast, in the vertical arrangement method, object data may be read by only one drive device 12 (drive 1), and another drive device 12 (drive 2) may be used for another processing, so that work efficiency may be improved. Thus, in the case where the data size of the object data is small, it may be said that the vertical arrangement method is suitable.

On the other hand, FIG. 12 illustrates an arrangement state of data on a tape by the horizontal arrangement method and an arrangement state of data on a tape by the vertical arrangement method, in a case where a data size (object size) of object data is large.

As illustrated in FIG. 12, in the case where the data size of the object data is large, in the horizontal arrangement method, busy time accounts for a small proportion of data access time, and the busy time becomes relatively shorter in the data access time. Thus, efficiency of read access to the tape is high.

Therefore, in the horizontal arrangement method, efficiency of tape access becomes higher in the case where the data size of the object data is large.

(D) Others

The disclosed technology is not limited to the embodiment described above, and various modifications may be made without departing from the spirit of the present embodiment. Each configuration and processing of the present embodiment may be selected or omitted as needed or may be appropriately combined.

For example, in the embodiment described above, the number of the drive devices 12 mounted in the library device 60 may be changed appropriately.

In addition, FIG. 5 illustrates the example in which a RAIT group is constituted using the four tapes T1 to T4, but the disclosed technology is not limited to such an example. The RAIT group may be constituted using three or less or five or more tapes, and various modifications may be made.

In the horizontal arrangement method, tapes used to record parity may be sequentially switched in rotation.

In addition, the present embodiment may be implemented and manufactured by those skilled in the art according to the disclosure described above.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:
1. A storage system comprising:
one or more drive devices;
an accommodation shelf including accommodation cells configured to accommodate a plurality of tape media;
a robot that performs conveyance operation to convey the tape media between the accommodation cells and the drive devices; and
a management apparatus that includes a memory and a processor coupled to the memory,
the processor is configured to:
receive an instruction including a plurality of pieces of data to be written;
generate, for each of the plurality of pieces of data included in the received instruction, a determination result by determining whether a data size of that data is less than a threshold; and
in response to obtaining of the determination result indicating that the data size is less than the threshold, generate an erasure coding set by performing an erasure coding processing on two or more pieces of data among the plurality of pieces of data, each of two or more pieces of data having the determination result indicating that the data size is less than the threshold, and allocate the generated erasure coding set including the two or more pieces of data to one of the plurality of tape media.

2. The storage system according to claim 1, wherein the processor is configured to calculate parity by using the two or more pieces of data allocated to the one tape medium.

3. The storage system according to claim 2, wherein the processor is configured to allocate the parity forming the erasure coding set together with the two or more pieces of data to a tape medium other than the one tape medium to which the two or more pieces of data are allocated among the plurality of tape media.

4. The storage system according to claim 1, wherein the processor is configured to:
  divide writing data having a data size equal to or larger than the threshold among the plurality of pieces of data to generate a plurality of data blocks, and
  allocate the plurality of data blocks in a distributed manner to two or more of the tape media.

5. The storage system according to claim 4, wherein the processor is configured to calculate parity by using the plurality of data blocks created by dividing the writing data.

6. The storage system according to claim 4, wherein the threshold is a data size of the writing data in a case where usage time of the drive device and total usage time of the plurality of drive devices match, the usage time of the drive device being taken to allocate the writing data to one tape medium and write the writing data to the one tape medium, the total usage time of the plurality of drive devices being taken to write the writing data to the plurality of tape media in the case where the plurality of data blocks are allocated in a distributed manner to the plurality of tape media.

7. The storage system according to claim 1, wherein the processor is configured to store data arrangement information indicating a position of the writing data on the tape medium.

8. A management apparatus, comprising:
  a memory; and
  a processor coupled to the memory and configured to:
    manage a library device including one or more drive devices, an accommodation shelf including accommodation cells configured to accommodate a plurality of tape media, and a robot that performs conveyance operation to convey the tape media between the accommodation cells and the drive devices;
    receive an instruction including a plurality of pieces of data to be written;
    generate, for each of the plurality of pieces of data included in the received instruction, a determination result by determining whether a data size of that data is less than a threshold; and
    in response to obtaining of the determination result indicating that the data size is less than the threshold, generate an erasure coding set by performing an erasure coding processing on two or more pieces of data among the plurality of pieces of data, each of two or more pieces of data having the determination result indicating that the data size is less than the threshold, and
    allocate the generated erasure coding set including the two or more pieces of data to one of the plurality of tape media.

9. A non-transitory computer-readable storage medium storing a program that causes a computer to execute a process, the process comprising:
  managing a library device including one or more drive devices, an accommodation shelf including accommodation cells configured to accommodate a plurality of tape media, and a robot that performs conveyance operation to convey the tape media between the accommodation cells and the drive devices;
  receiving an instruction including a plurality of pieces of data to be written;
  generating, for each of the plurality of pieces of data included in the received instruction, a determination result by determining whether a data size of that data is less than a threshold;
  in response to obtaining of the determination result indicating that the data size is less than the threshold, generating an erasure coding set by performing an erasure coding processing on two or more pieces of data among the plurality of pieces of data, each of two or more pieces of data having the determination result indicating that the data size is less than the threshold; and
  allocating the generated erasure coding set including the two or more pieces of data to one of the plurality of tape media.

* * * * *